United States Patent
Bobrovniczky

(10) Patent No.: US 6,988,740 B2
(45) Date of Patent: Jan. 24, 2006

(54) SUSPENSION FOR BICYCLE SEAT AND HANDLEBAR SUPPORT

(76) Inventor: Bert Bobrovniczky, 5 Hermit Court, Don Mills (CA) M3B 1R4

( * ) Notice: Subject to any disclaimer, the term of this patent is extended or adjusted under 35 U.S.C. 154(b) by 185 days.

(21) Appl. No.: 10/773,321

(22) Filed: Feb. 9, 2004

(65) Prior Publication Data

US 2005/0236802 A1    Oct. 27, 2005

(51) Int. Cl.
 *B62K 1/00* (2006.01)
(52) U.S. Cl. .................. 280/276; 280/281.1; 280/279; 297/195.1; 297/209
(58) Field of Classification Search ............... 280/275, 280/276, 278–280, 283, 281.1; 180/219; 297/195.1, 208–211
See application file for complete search history.

(56) References Cited

U.S. PATENT DOCUMENTS

| | | | |
|---|---|---|---|
| 600,686 A | | 3/1898 | Dubrow |
| 674,864 A | | 5/1901 | Green |
| 699,400 A | | 5/1902 | Lewis |
| 962,443 A | | 6/1910 | Loudenclos |
| 3,796,460 A | * | 3/1974 | Potchen ............ 297/211 |
| 4,057,264 A | * | 11/1977 | Suzuki et al. ........... 280/276 |
| 4,456,295 A | * | 6/1984 | Francu ............ 297/211 |
| 5,383,705 A | | 1/1995 | Voigt |
| 5,443,301 A | * | 8/1995 | Lai ............ 297/195.1 |
| 5,511,444 A | | 4/1996 | Clausen et al. |
| 5,564,671 A | * | 10/1996 | Cheng ............ 248/601 |
| 5,715,903 A | * | 2/1998 | Summers et al. ........ 180/219 |
| 5,921,145 A | | 7/1999 | Muser |
| 6,017,047 A | * | 1/2000 | Hoose ............ 280/276 |
| 6,332,625 B1 | * | 12/2001 | Fukunaga et al. ........ 280/280 |
| 6,626,490 B2 | * | 9/2003 | Williams et al. ....... 297/215.15 |

FOREIGN PATENT DOCUMENTS

CH    682904 A5    12/1993

* cited by examiner

*Primary Examiner*—Lesley D. Morris
*Assistant Examiner*—L. Lum
(74) *Attorney, Agent, or Firm*—Ogilvy Renault LLP; Paul J. Field

(57) ABSTRACT

A suspension device for disposition between a support post of a bicycle and a suspended member, such as a bicycle seat and bicycle handlebars, having an invertible connector body with a support post mounting, a horizontal median and two shoulder surfaces disposed above the median or below the median. The connector body has at least two sleeves with two slide pins slidably mounted in and passing through the two sleeves, and a top bracket and a bottom bracket fixed to top and bottom ends of said slide pins, with two springs disposed between the shoulder surfaces and the brackets and a seat or handlebar mounting connected to the top bracket.

16 Claims, 9 Drawing Sheets

SUSPENSION FOR BICYCLE SEAT AND HANDLEBAR SUPPORT

TECHNICAL FIELD

The invention relates to a shock terminator suspension for a bicycle seat and for a bicycle handlebar.

BACKGROUND OF THE ART

The design of conventional bicycles includes various means to reduce the shock and impact imposed on by the rider and bicycle.

For example, pneumatic tires and spring loaded seats are a minimum provision whereas modern mountain bikes include spring loaded shock absorbers on front forks as well as rear shock absorbers between a hinged rear wheel mounting and the bicycle frame.

A significant disadvantage of conventional shock absorbers is cost and weight. Specially designed front forks can be retrofit to an existing bicycle frame fairly easily but must be purchased and installed. For rear shocks, the entire bicycle frame must be specially adapted since the rear wheel suspension is hinged to the frame and the seat is usually supported on a cantilevered post. Retrofitting rear wheel shocks is impractical and a specially adapted frame is required.

It is an object of the present invention to provide a simple inexpensive suspension device for both the bicycle handlebars and the seat which can be retrofit to any bicycle frame, is easily adjustable and configured.

Further objects of the invention will be apparent from review of the disclosure, drawings and description of the invention below.

DISCLOSURE OF THE INVENTION

The invention provides a suspension device for disposition between a support post of a bicycle and a suspended member, such as a bicycle seat and bicycle handlebars, having an invertible connector body with a support post mounting, a horizontal median and two shoulder surfaces disposed above the median or below the median. The connector body has at least two sleeves with two slide pins slidably mounted in and passing through the two sleeves, and a top bracket and a bottom bracket fixed to top and bottom ends of said slide pins, with two springs disposed between the shoulder surfaces and the brackets and a seat or handlebar mounting connected to the top bracket.

DESCRIPTION OF THE DRAWINGS

In order that the invention may be readily understood, one embodiment of the invention is illustrated by way of example in the accompanying drawings.

Further details of the invention and its advantages will be apparent from the detailed description included below.

DETAILED DESCRIPTION OF PREFERRED EMBODIMENTS

Figure 1:
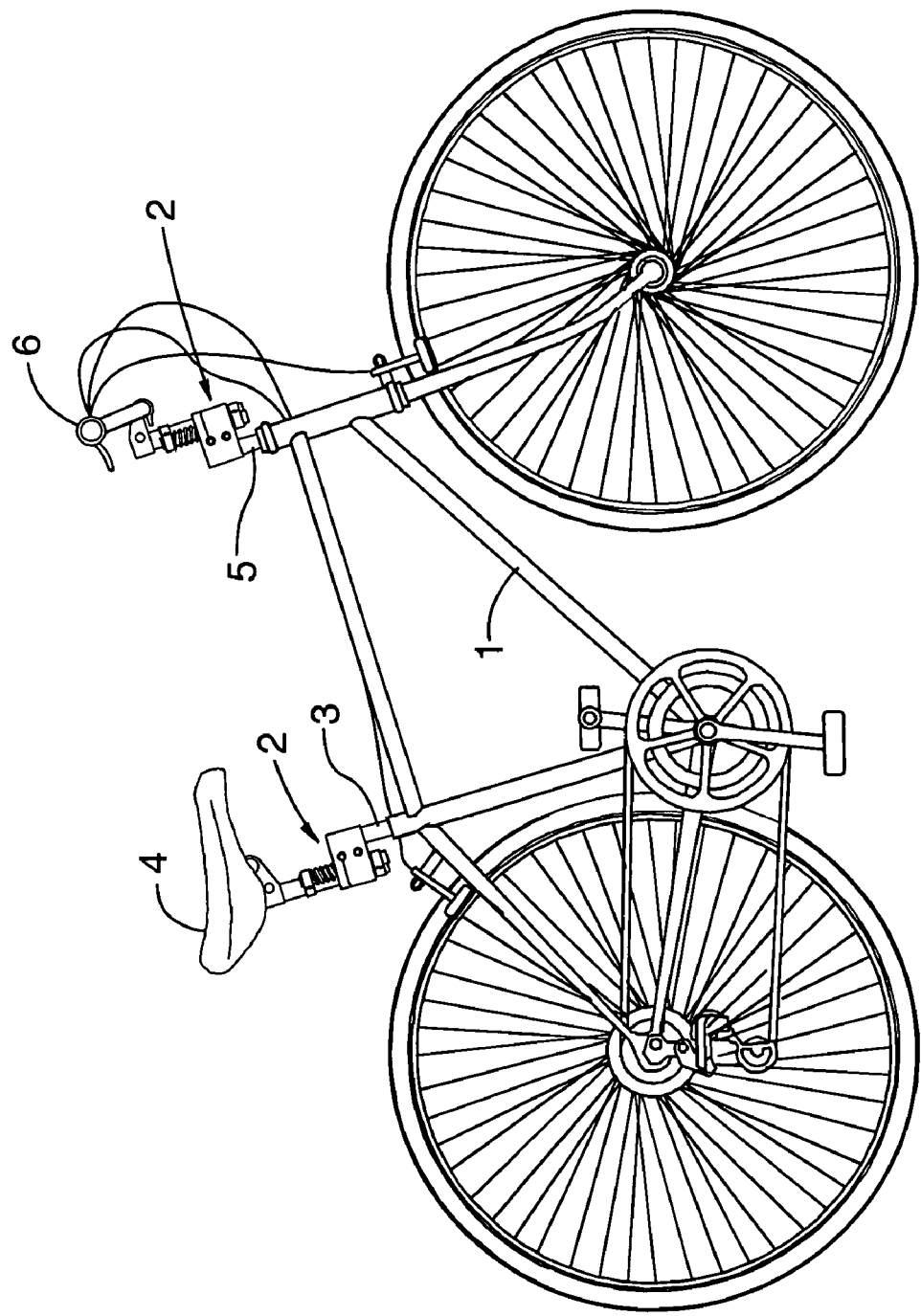
FIG. 1 is a side elevation view of a conventional bicycle, having no front or rear shock absorbers, with the suspension device according to the invention disposed between the seat support post and the seat, and between the front handlebars and the handlebar support stem.
Figure 2:
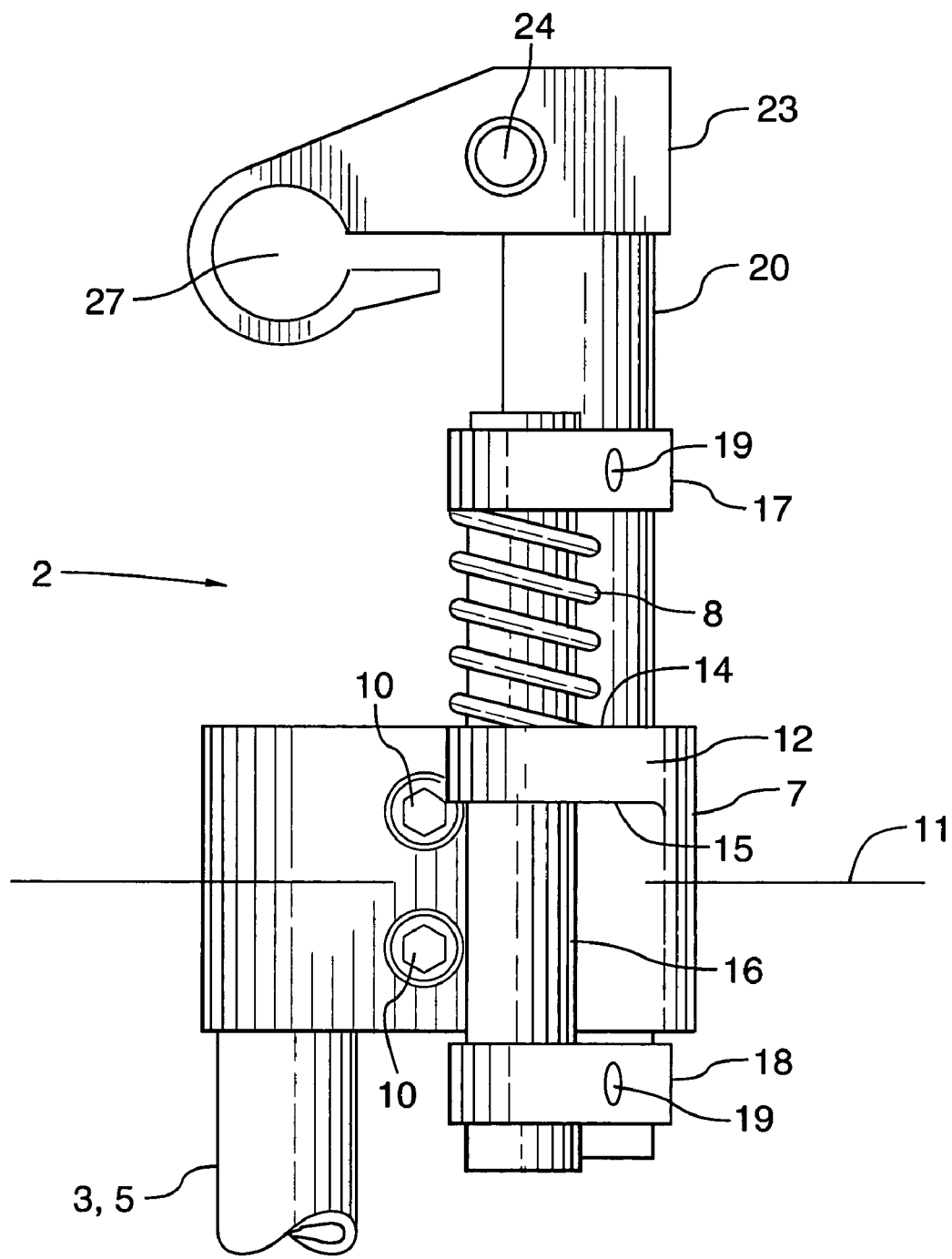
FIG. 2 is side view of the suspension device in one configuration.
Figure 3:
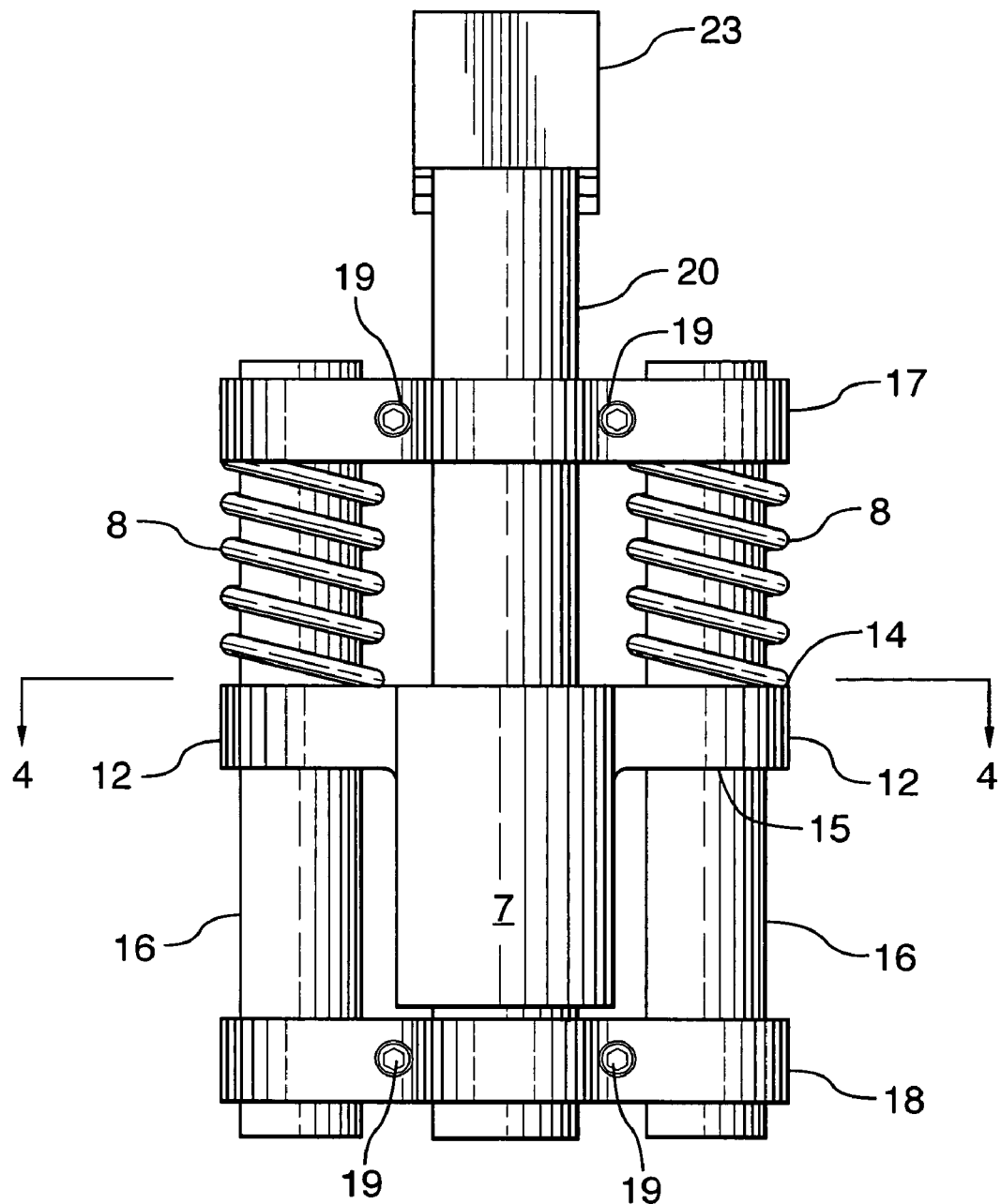
FIG. 3 is front view of the suspension device.

FIG. 1 shows a conventional bicycle frame 1 with no shock absorbing front shocks or rear wheel suspension system. Two suspension devices 2 according to the invention are installed, namely: between the seat post 3 and the seat 4; and between the handlebar stem 5 and the handlebars 6.

Figure 8:
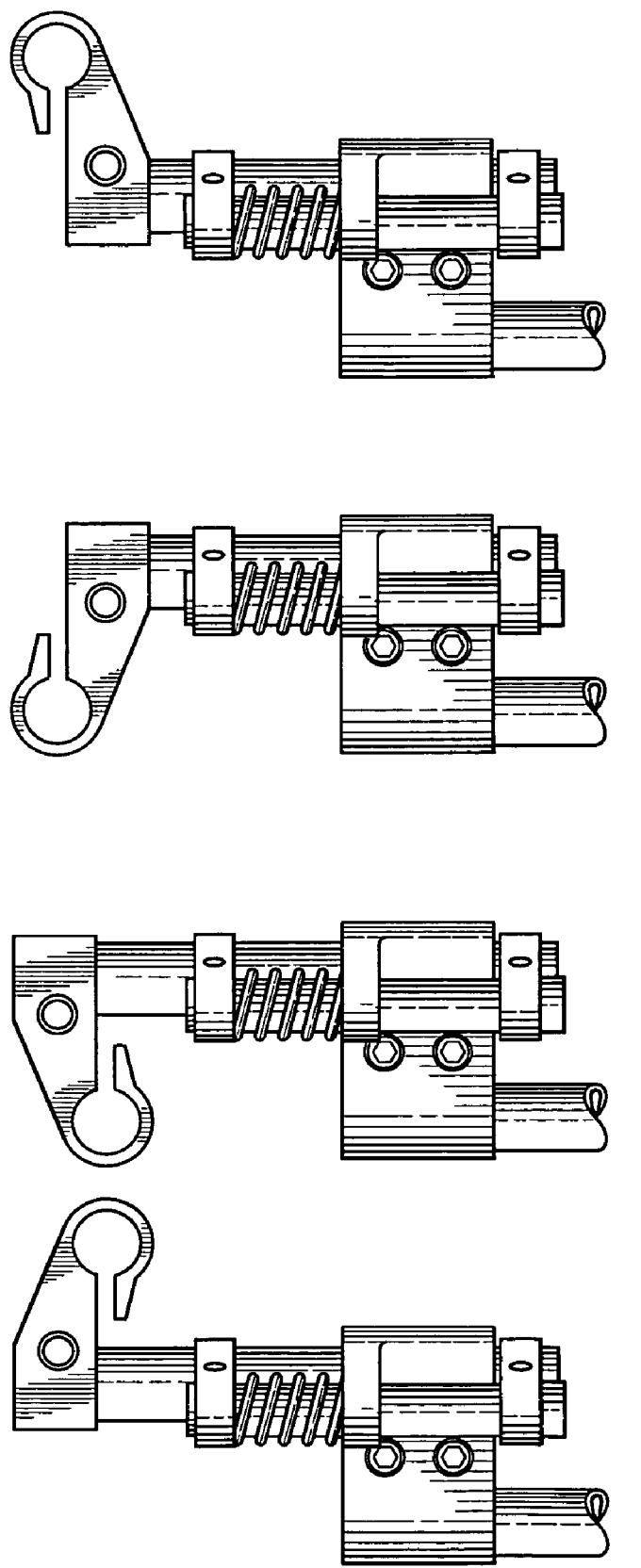
FIGS. 8–9 are side views similar to FIG. 2 showing some of the various configurations possible.
Figure 9:
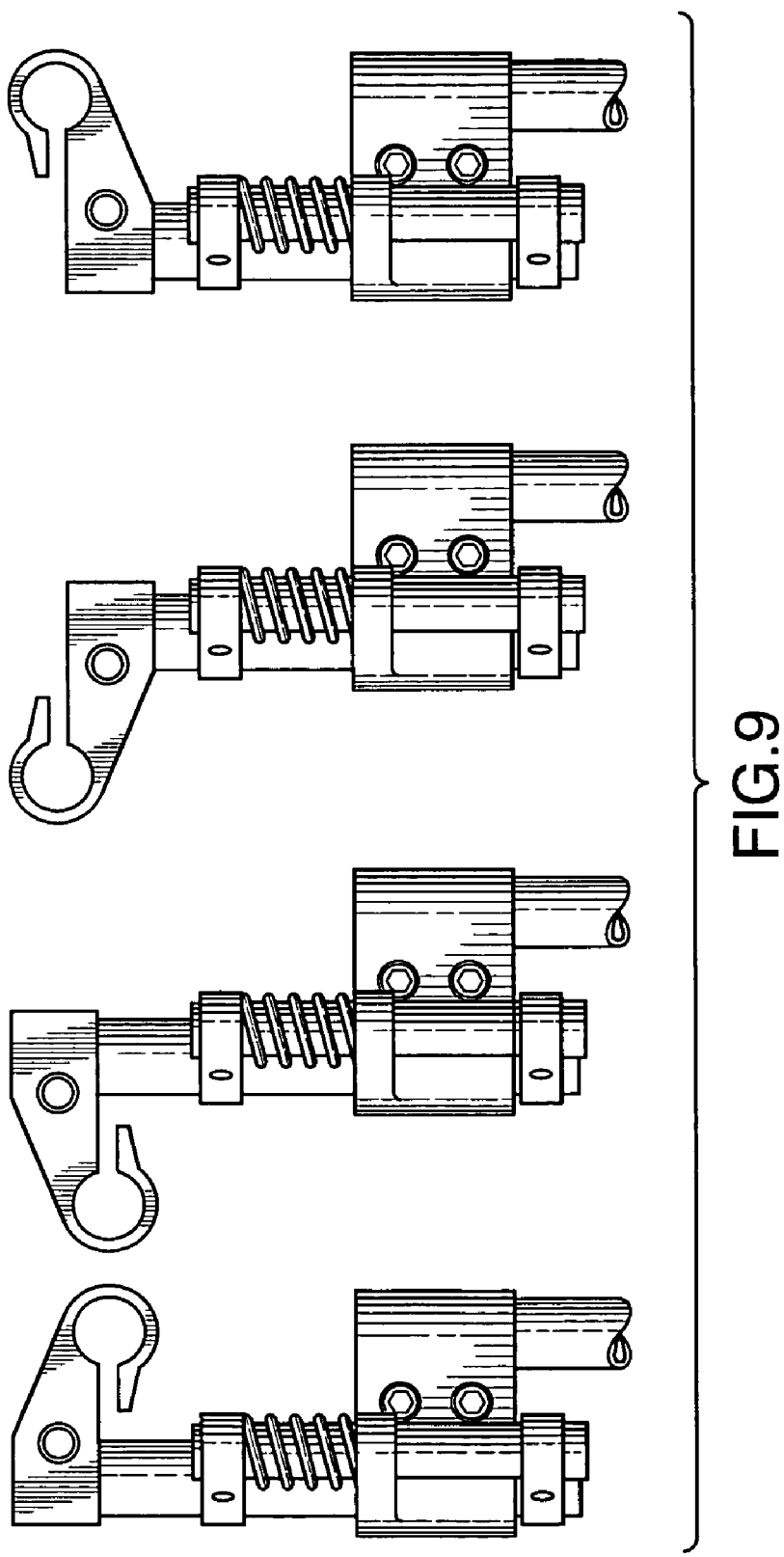

FIGS. 2–5 show the details of a preferred embodiment of the suspension device in one configuration. Other possible configurations are suggested by FIGS. 8–9, and others are of course possible when the invertible connector body 7 is inverted and different numbers and lengths of springs 8 are used, as in FIG. 7.

Figure 4:
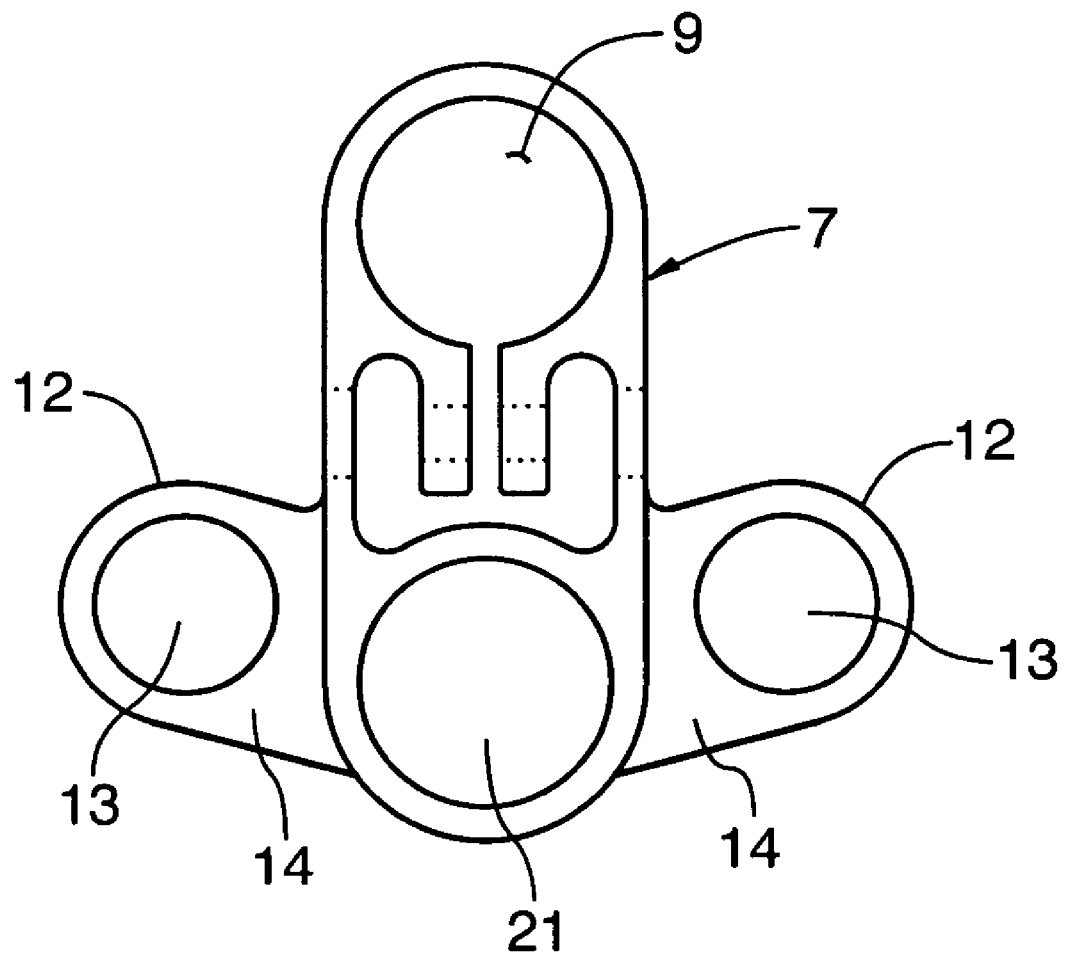
FIG. 4 is a sectional view through the connector body along line 4—4 of FIG. 3.

The invertible connector body 7 can be mounted to the seat post 3 or handlebar stem 5 equally. The connector body 7 can include a mounting which as best seen in FIG. 4 comprises a split bore 9 which clamps the supporting post 3, 5 with two clamping screws 10. The invertible connector body 7 can have a horizontal median 11 and two laterally extending tabs 12 with sleeves 13 extending through. The top and bottom shoulder surfaces 14, 15 of the tabs 12 in the embodiment shown engage the springs 8 which may be disposed about the two slide pins 16. The slide pins 16 are slidably mounted in and pass through the sleeves 13.

Figure 5:
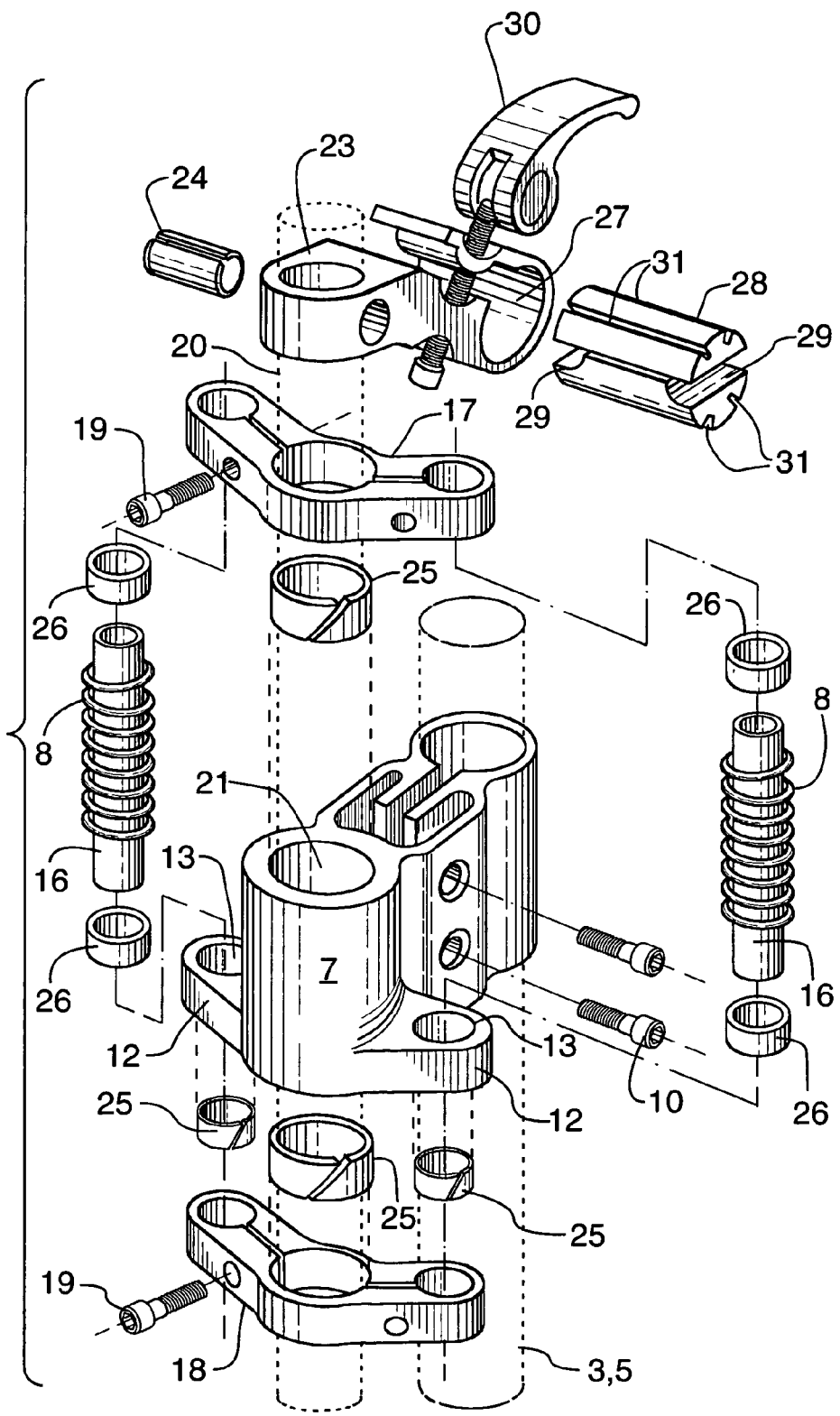
FIG. 5 is an exploded view of a second embodiment of the suspension device with similar lower members (except that the connector body is inverted as in FIG. 7) and having a top suspended member mount that varies from that shown in FIG. 2 in that it includes a quick release cam locking clamp.

Top bracket 17 and bottom bracket 18 may be fixed by various means or preferably clamped in a removable manner to the top and bottom ends of the slide pins 16. As best seen in FIG. 5 the top and bottom brackets 17, 18 may be split housings removably clamped to the slide pins with clamping screws 19. The springs 8 can be pre-loaded or pre-compressed to a selected degree by loosening the clamping screws 19, sliding the top bracket 17 downward and then re-tightening the clamping screws 19. As a result, the resilience of the compression springs 8 may be modified through pre-compression to result in a tighter or looser suspension in a very simple manner. The springs 8 in the embodiments shown are compression springs compressed under load between the top bracket 17 and the top shoulder surface 14 of the tabs 12. However it will be equally apparent that tension springs may be disposed between the bottom bracket 18 and the bottom shoulder surface 15 of the tabs 12 in addition to or in replacement of the compression springs 8 shown.

Figure 7:
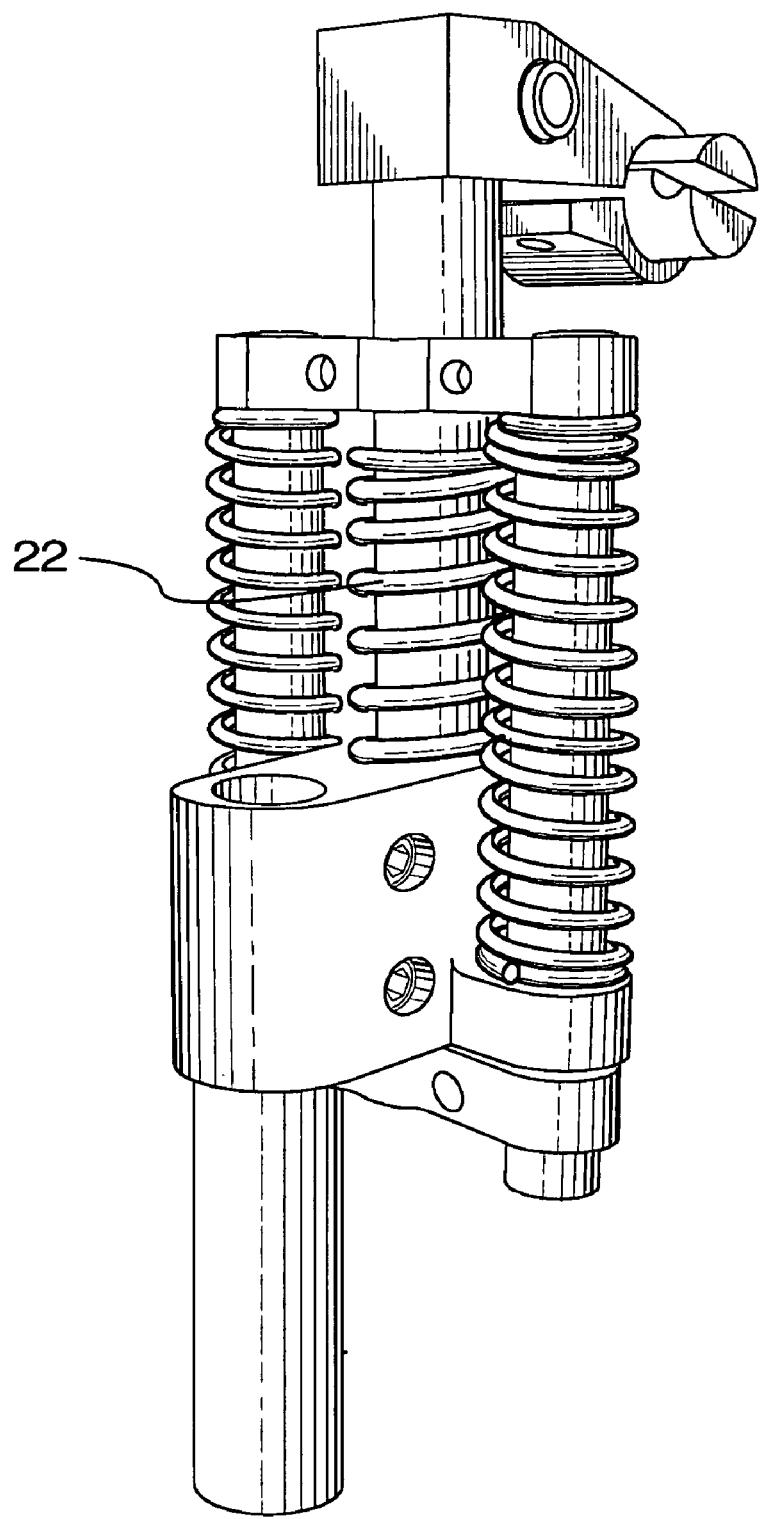
FIG. 7 shows a different configuration with the connector body inverted and with three springs, two of which are relatively longer.

Further the embodiments shown all include a third slide pin 20 with top and bottom ends clamped into the top and bottom brackets 17, 18 to slide vertically with the two lateral slide pins 16. The third slide pin 20 is shown with a relatively larger diameter than the lateral pins 16 but this is not essential and any relative size may be selected. The third slide pin 20 is also slidably mounted to the invertible connector body 7 in a third sleeve 21. the embodiment shown in FIG. 7 shows the third slide pin 21 fitted with a third spring 22 between the top bracket 17 and the invertible connector body 7 for added resilience in combination with lateral springs 8 of extended length. The third spring 22 could also be located between the bottom bracket 18 and the connector body 7 either in tension or possibly in compression for damping the upstroke. As shown in FIG. 4, the sleeves 13, 21 may be arranged in a triangular pattern to reduce torque on the sliding assembly and reduce bending moment of the assembly in use.

Sleeve bearings 25 of polymer may be installed between the slide pins 16, 20 and their respective sleeves 13, 21 in the invertible connector body 7 to provide wear resistance, and ease of sliding operation. Resilient neoprene elastomer rings 26 between the slide pins 16, 20 and the top and bottom brackets 17, 18 optionally provide further damping capacity.

In the embodiments illustrated the handlebar 6 or seat 4 suspended member mounting head 23 is connected to the top end of the third slide pin 20 with a spring tension pin 24. The mounting head has a horizontal bore 27 that can accommodate handlebars 6 passed through, or can hold the split seat rail clamp 28 that has two extending ends with seat rail engaging surfaces 29 to clamp and secure the longitudinal rails (not shown) of the seat 4. The horizontal bore 27 is split and clamps the handlebars 6 or rail clamp 28 when closed with a simple bolt or in the second embodiment shown in FIG. 5, with a cam locking clamp 30. The split rail seat clamp 28 has slots 31 for engaging a resilient elastomer material to resist seat rotation when clamped in the horizontal bore.

Figure 6:
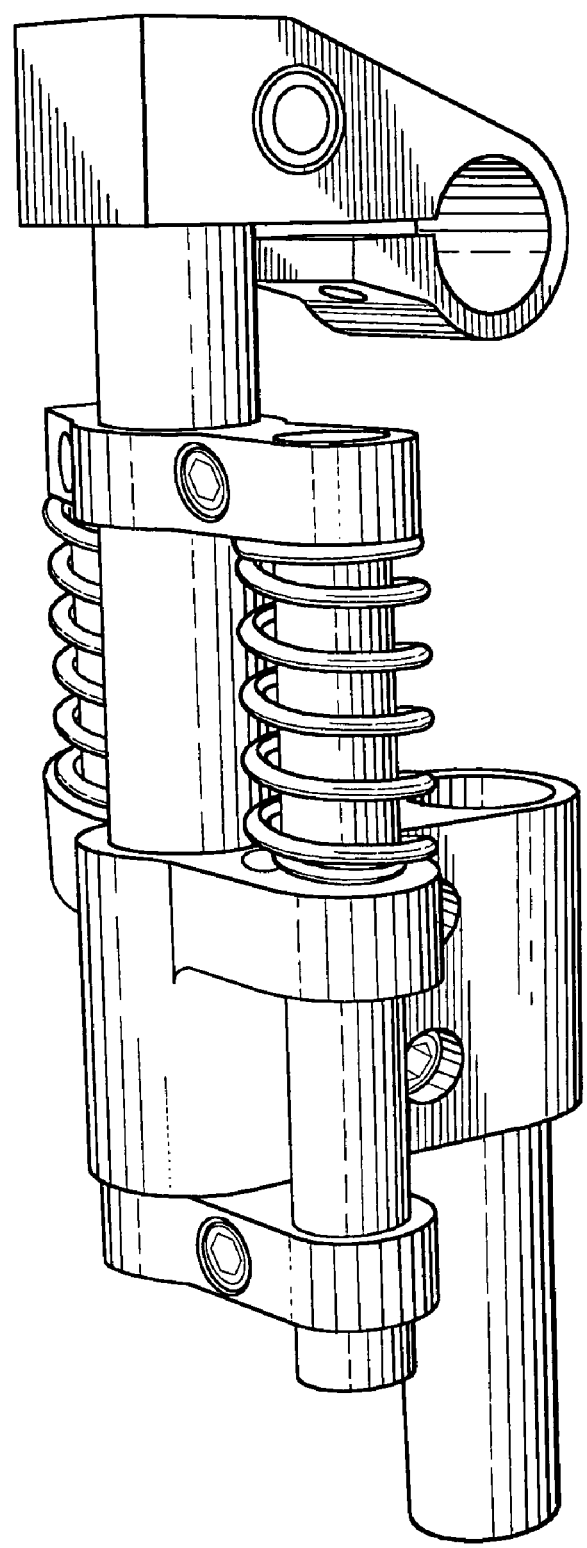
FIG. 6 is a front perspective view of the configuration shown in FIG. 2 with two relatively short springs.

The invention provides a suspension device that can be retrofitted to both the seat post 3 and the handlebar stem 5 easily and without modifying the bicycle frame 1. The design is robust and very simple to adjust, repair and reconfigure as suggested by comparison between FIGS. 6 and 7 as well as FIGS. 8–9. The connector body can be inverted or rotated, the mounting head 23 can be rotated, two or three springs 8, 22 may be installed, different strengths or lengths of springs 8, 22 can be easily accommodated and the brackets 17, 18 can be used to pre-compress the springs 8, 22 if desired. In the embodiment shown, all adjustments and repairs can be undertaken with simple tools like an Allen key only.

Although the above description relates to a specific preferred embodiment as presently contemplated by the inventor, it will be understood that the invention in its broad aspect includes mechanical and functional equivalents of the elements described herein.

I claim:

1. A suspension device for disposition between a support post of a bicycle and a suspended member, including a bicycle seat and bicycle handlebars, the device comprising
an invertible connector body having a support post mounting, a horizontal median, and two shoulder surfaces disposed in a position selected from the group consisting of: above the median, and below the median; the connector body having two sleeves;
two slide pins slidably mounted in, and passing through said two sleeves;
a top bracket and a bottom bracket, fixed to top and bottom ends of said brackets;
two springs disposed between said shoulder surfaces, and one of said brackets; and,
a suspended member mounting connected to the top bracket.

2. A suspension device according to claim 1 wherein the invertible connector body has two laterally extending tabs within which the sleeves extend and each tab having top and bottom shoulder surfaces.

3. A suspension device according to claim 1 wherein the invertible connector body includes a third sleeve housing a third slide pin with top and bottom ends fixed to the top and bottom brackets.

4. A suspension device according to claim 3 including a third spring disposed between the connector body and one of the top and bottom brackets.

5. A suspension device according to claim 3 wherein the third slide pin has the suspended member mounting connected to a top end thereof.

6. A suspension device according to claim 1 wherein the springs are disposed about the slide pins.

7. A suspension device according to claim 1 wherein at least one slide pin includes a resilient ring disposed between one end and one said bracket.

8. A suspension device according to claim 7 wherein the resilient ring comprises a neoprene elastomer.

9. A suspension device according to claim 1 wherein the sleeves include sleeve bearings.

10. A suspension device according to claim 9 wherein the sleeve bearings are polymer bearings.

11. A suspension device according to claim 1 wherein the top and bottom bracket comprise a split housing with a clamping screw.

12. A suspension device according to claim 1 wherein the support post mounting of the connector body comprises a split through bore with at least one clamping screw.

13. A suspension device according to claim 1 wherein the suspended member mounting comprises a horizontal bore.

14. A suspension device according to claim 13 wherein the horizontal bore is split and the suspended member mounting includes a cam locking clamp.

15. A suspension device according to claim 13 including a split seat rail clamp adapted for mounting within the horizontal bore and having two ends with seat rail engaging surfaces.

16. A suspension device according to claim 15 wherein the split seat rail clamp has slots engaging a resilient elastomer material.

* * * * *